INVENTORS
Norman C. Poel
John C. Baxter
Robert J. McKnight

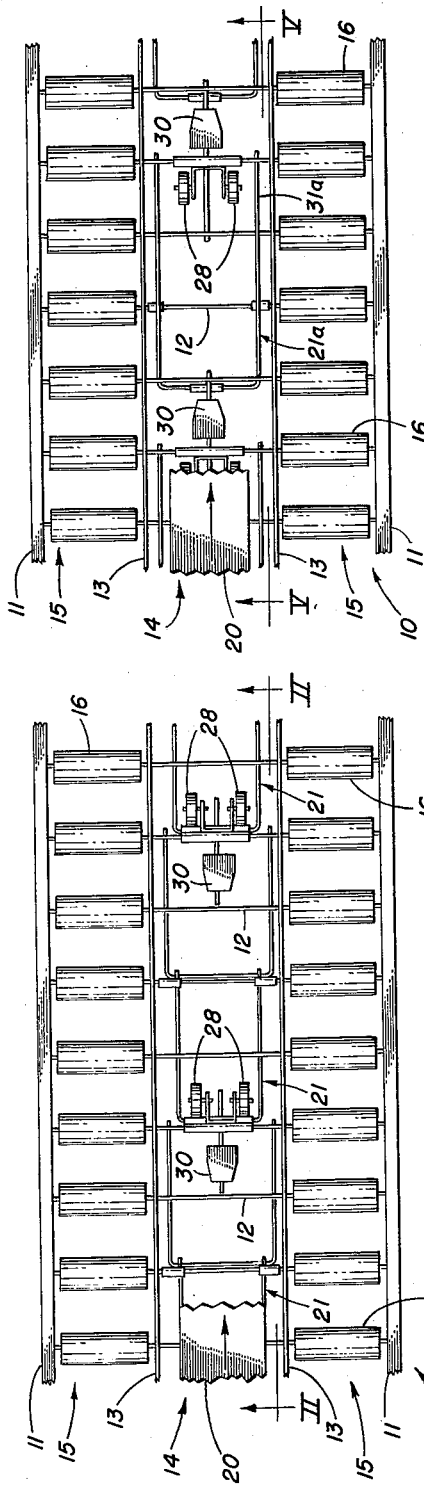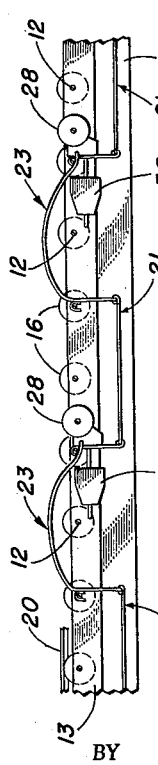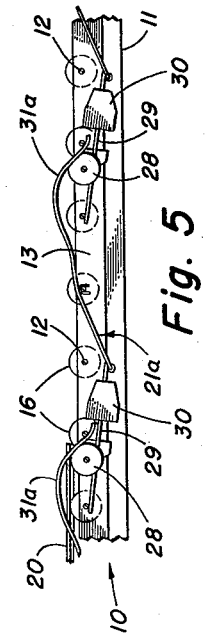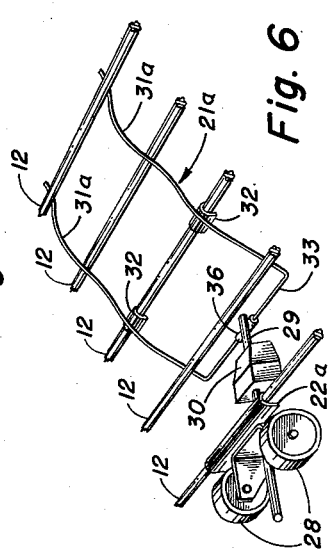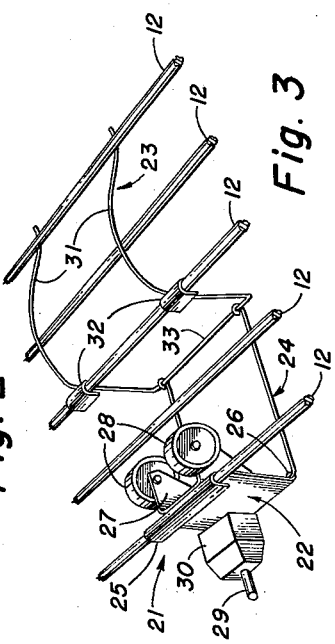
INVENTORS
Norman C. Poel
John C. Baxter
Robert J. McKnight
ATTORNEYS Sept. 19, 1961  N. C. POEL ET AL  3,000,489
SENSING DEVICE Filed May 29, 1959  4 Sheets-Sheet 3

BY
ATTORNEYS

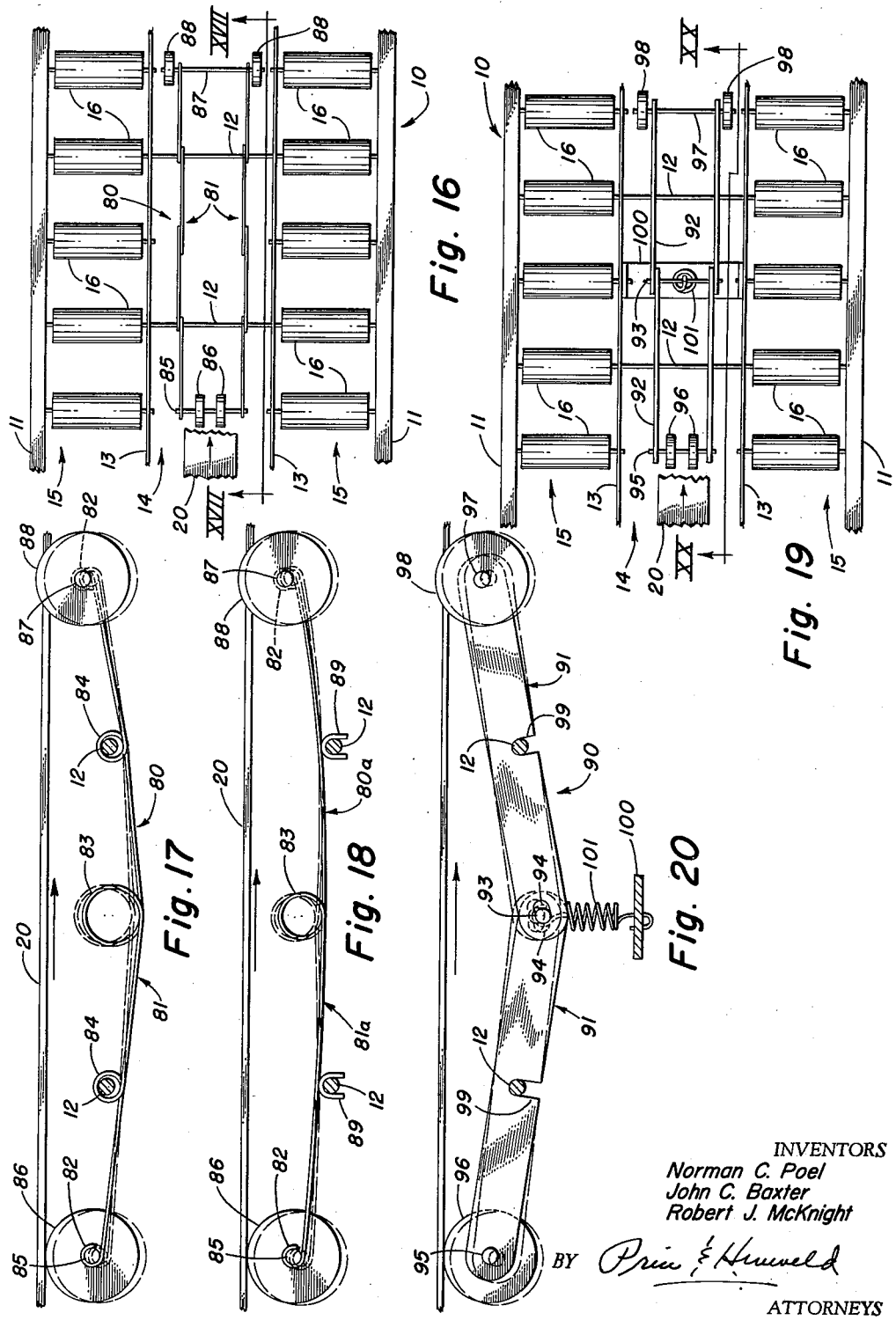

3,000,489
Patented Sept. 19, 1961

1

3,000,489
SENSING DEVICE
Norman C. Poel, Grand Rapids, and John C. Baxter, East Grand Rapids, Mich., and Robert J. McKnight, Upper Montclair, N.J., assignors to The Rapids Standard Company Inc., Grand Rapids, Mich., a corporation of Michigan
Filed May 29, 1959, Ser. No. 816,900
19 Claims. (Cl. 198—160)

This invention relates to conveyors and more particularly to conveyors having a central, powered propelling member flanked by article supporting tracks. The propelling member is supported by means for regulating the propelling force it exerts upon the articles.

More particularly, the invention relates to the construction of the means for regulating the position of the propelling member with relation to the articles on the conveyor.

This invention is an improvement over the basic type of conveyor described in co-pending application Serial No. 795,435, filed February 25, 1959, and entitled Accumulator Conveyor.

This invention provides, in its general embodiment, two improvements over the conveyor constructions illustrated in the co-pending application. By reason of their design, the particular fittings and components by which the height of the propelling member is regulated are comparatively inexpensive to fabricate and the utmost in simplicity to install. Further, the design of the components is such that they are particularly suited to use on conveyors of a type intended to transport irregular articles or articles having indented bottoms. Such articles normally must be conveyed on roller conveyors, as opposed to wheel conveyors. Exemplary of such articles are those packed in sacks, such as flour or sugar. Chimed barrels are exemplary of another type of article to which this invention is particularly suited. Produce crates having spaced slats and other types of articles so constructed that they have a tendency to hang up on wheel type conveyors have particular utility for this invention.

These and other objects and purposes of this invention will be immediately understood by those acquainted with the design and construction of conveyors upon reading the following specification and the accompanying drawings.

FIG. 1 is a fragmentary, plan view of a conveyor incorporating this invention;

FIG. 2 is a fragmentary, sectional, elevation view taken along the plane II—II of FIG. 1;

FIG. 3 is a fragmentary, oblique view of one of the belt support systems illustrated in FIGS. 1 and 2;

FIG. 4 is a fragmentary, plan view of a conveyor having a modified form of this invention;

FIG. 5 is a fragmentary, sectional, elevation view taken along the plane V—V of FIG. 4;

FIG. 6 is a fragmentary, oblique view of one of the belt support systems used in the conveyors illustrated in FIGS. 4 and 5;

FIG. 16 is a fragmentary plan view of a still further modification of this invention;

FIGS. 17 and 18 are sectional elevation views taken along the plane XVII—XVII of FIG. 16, FIG. 17 showing the device looped about the axles for support and FIG. 18 showing the device equipped with pivot pieces for this purpose;

FIG. 19 is a fragmentary plan view of still another modification of this invention;

FIG. 20 is a sectional elevation view taken along the plane XX—XX of FIG. 19.

Figure 8:
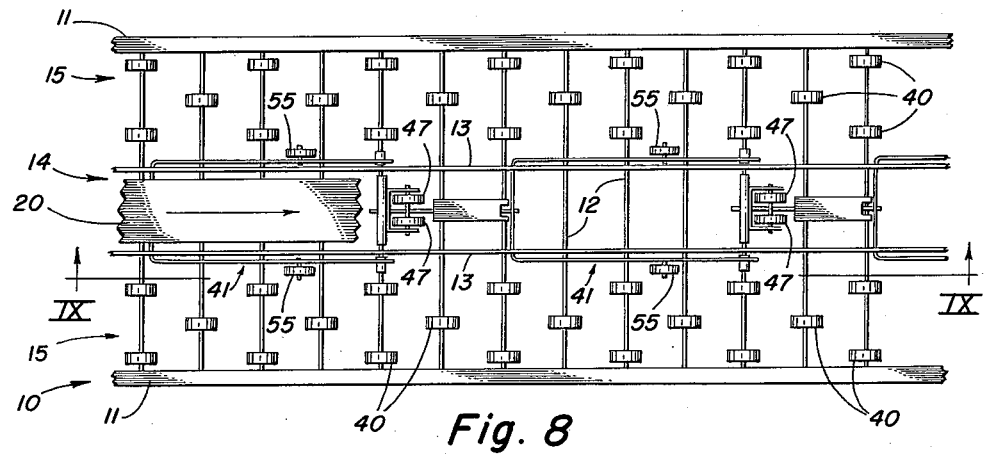
FIG. 8 is a fragmentary, plan view of a further modified form of this invention.

In the following description, the term "downstream" is used to define the direction toward which the propelling member is moving, or to the right in FIG. 1. The term "upstream" designates the opposite direction. The term "forwardly" and "rearwardly" are used interchangeably with downstream and upstream, respectively.

Referring to the drawings, the numeral 10 indicates a conveyor bed having a pair of side rails 11 extending lengthwise of the conveyor in spaced, parallel relationship. Spanning the area between the rails 11 are a plurality of axles 12 spaced apart lengthwise of the conveyor. Extending lengthwise of the conveyor are a pair of laterally spaced, intermediate rails 13. The intermediate rails 13 are spaced from the side rails 11, defining a centrally located medial lane 14 flanked by a pair of conveyor tracks 15. In each of the flanking conveyor tracks 15, rollers 16 are mounted on the axles 12. The rollers are mounted for free rotation upon the axles.

A suitable propelling member 20 travels lengthwise of the conveyor in the medial lane 14 in the direction of the arrow. The propelling member 20 may be a belt, chain, rope, or other of the various propelling members used in conventional conveyors. It is characterized by being narrow and confined to the center portion of the conveyor. It is operated by a suitable power system and designed to be operated continuously when the conveyor is in use. The power drive mechanism by which the propelling member 20 is caused to move is not illustrated since this is conventional and may consist of any of the many mechanisms currently in use on power operated conveyors.

At spaced intervals, lengthwise of the conveyor, the propelling member 20 is supported by pressure assemblies 21. One of these pressure assemblies is illustrated in FIG. 3 and consists of a hanger 22, a sensing fitting 23, and a link 24. The hangers 22 are flanged over at the top to form a hook 25 adapted to engage over and swing about one of the axles 12. The main body of the hanger 22 depends below the axle 12 and, at its lower end, has an upwardly turned flange 26, creating a channel for engaging the link 24. Projecting downstream from the main body of the hanger 22 are a pair of ears 27, each of which, adjacent its free end, mounts a freely rotatable propelling member supporting wheel 28. Projecting oppositely from the flanges 27 is a stud 29 on which is mounted a counterweight 30. Preferably the counterweight 30 is movable along the stud 29 to permit adjustment of the upward force exerted by the wheels 28 against the propelling member 20.

The sensing fitting 23 is generally L-shaped when viewed from the side and U-shaped when viewed from the top. The sensing fitting has a pair of sensing fingers 31. These are bowed upwardly in their central portion to project well above the plane of the top surface of the rollers 16. They are spaced apart sufficiently that they rise up through the conveyor bed on each side of the propelling member 20 and preferably between the propelling member 20 and the intermediate rails 13. It will, however, be understood that under the proper circumstances the sensing fingers could be located adjacent to but on the outer side of the intermediate rails 13. The sensing fitting has a pair of pivot pieces 32, one on each of the fingers 31. These pivot pieces are generally of an inverted U-shape and are designed to seat over and swing about one of the axles 12. At the pivot pieces the sensing fitting extends downwardly to its cross piece 33. The free ends of the sensing fingers 31 are curved downwardly and extend under another one of the axles 12 and contact between these ends and this axle serves as a stop, limiting upward, swinging movement of the sensing fitting 23 in response to the biasing effect exerted by the counterweight 30.

The sensing fitting is operatively connected to the hanger 22 by means of a U-shaped link 24 pivotally connected on one end to the cross piece 33 of the sensing fitting and at the other end pivotally seated in the channel formed by the lower flange 26 of the hanger 22.

It will be seen that the pressure assemblies can be quickly mounted on the conveyor simply by seating the hanger 22 over one axle, the sensing fitting 23 over another axle, with the ends of the fingers seated beneath a third axle. The link 24, preferably previously assembled to the sensing fitting 23, can then be seated in the channel 26 of the hanger 22. Upon proper adjustment of the position of the counterweight 30, the unit is ready for operation.

The pressure assemblies 21 provide the sole means of support for the propelling member 20 except for the end pulleys over which the propelling member travels. The free ends of the sensing fitting are designed to bear against the shaft 12 as a stop for their upper limit of travel at a point where the support wheels 28 hold the conveyor member 20 such that its top of conveying surface is flush with or slightly above the plane of the top surfaces of the rollers 16. The counterweight 30 is so positioned that the pressure assembly 21 will hold the belt in this position when the conveyor is free of any load and will afford the propelling member 20 sufficient upward pressure that it is capable of transporting the articles along the conveyor bed.

It will be noted that sensing fitting 23 is mounted downstream of the hanger 22. Thus, the depression of the sensing fitting by an article moving along the conveyor bed will depress the corresponding hanger upstream of the sensing fitting. In operation, the articles being moved along the conveyor by the propelling member 20 will, as they progress along the conveyor, successively depress one sensing fitting 23 after another and in so doing they will lower the corresponding support wheels 28. Thus, the propelling member 20 upstream or rearwardly of the article will drop. The upward bow or arching of the fingers 31 is such that the movement of the article over the sensing fitting will cause sufficient downward movement of the interlinked wheels 28 to permit the portion of the propelling member 20 above the wheels 28 to drop to a point where it disengages any article resting on the conveyor at that point. Thus, the propelling force exerted upon such article is released and its movement will cease.

The sensing fitting 23 and preferably the link 24 are fabricated from small diameter rod or wire. They are thus easy and inexpensive to fabricate and inexpensive to replace. Because of the long curved contact surface they present to the articles, articles will move over them with minimal interference and retarding effect. Since the portion of the sensing fittings contacting the article is a long gradually curved arc, they offer no structure which is likely to snag or otherwise tightly engage the article. This is particularly important in articles having a rough, indented or uneven lower surface.

Figure 7:
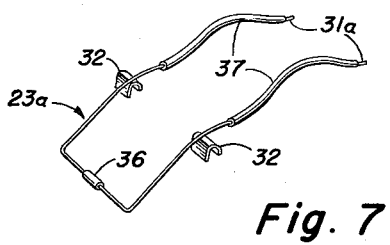
FIG. 7 is an oblique view of a modified form of the sensing fitting of the system illustrated in FIG. 6.

FIGS. 4, 5 and 6 illustrate a very similar arrangement of this invention. The conveyor track is identical and contains the same medial lane and propelling member. However, in the case of the pressure assemblies 21a, the hanger is reversed with the propelling member supporting wheels 28 positioned upstream rather than downstream of the axle 12 upon which the hanger 22a is pivotally supported. In this case, the stud 29 projects downstream and thus the counterweight 30 is downstream of the pivot point for the hanger 22a. The sensing fitting 23a is quite similar to the sensing fitting 23, having a pair of sensing fingers 31a upwardly bowed or arched to extend well above the plane of the top surfaces of the rail 16 and the propelling member 20. Intermediate its ends and upstream or rearwardly of the arched portion of the sensing fingers 31a, the sensing fitting 21a has a pair of pivot pieces 32, designed to seat rockably about one of the shafts 12. The upstream or rearward end of the sensing fitting 23a extends rearwardly or upstream of the conveyor. And downwardly the rearward end of the fitting is inclined sharply downwardly and terminates in a cross bar 33 which extends under the forward end of the stud 29. In the area of contact between the stud and the sensing fitting, the sensing fitting is preferably surrounded by a wear resistant jacket 36. This may be a sleeve of synthetic resinous material having a lubricious or low friction surface. A material suitable for this purpose would be a polyamide such as that sold under the trademark nylon by E. I. du Pont de Nemours. As illustrated in FIG. 7, the same type of low friction wear resistant jacket or sleeve 37 may be seated about the arched portion of the sensing fingers 31a.

As an article being propelled along the conveyor by the propelling member 20 passes over the sensing fitting 21a, the downstream or forward end of the sensing fitting is pivoted downwardly, causing the cross bar 33 to rise. This lifts the stud 29, pivoting the propelling member supporting wheels 28 downwardly. The height of the arches of the sensing fingers 31a is such that the downward movement of the support wheels 28 will permit the propelling member to drop to a position of total disengagement from any article immediately over the support wheels 28 and resting on the rollers 16.

As in the case of the sensing fitting 21, the sensing fitting 21a is preferably fabricated from small diameter rod or wire. Again, this makes a lightweight, inexpensive and effective structure. Furthermore, it is capable of quick and easy replacement or temporary removal. The cost of replacement is practically negligible with respect to the cost of the conveyor track as a whole.

Figure 9:
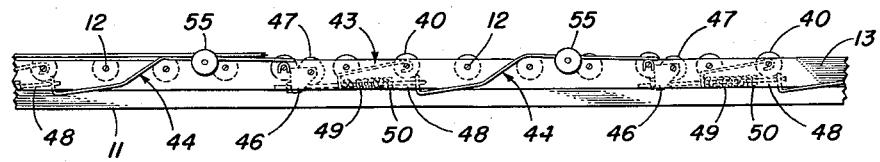
FIG. 9 is a fragmentary, sectional, elevation view taken along the plane IX—IX of FIG. 8 with the intermediate rail omitted.
Figure 10:
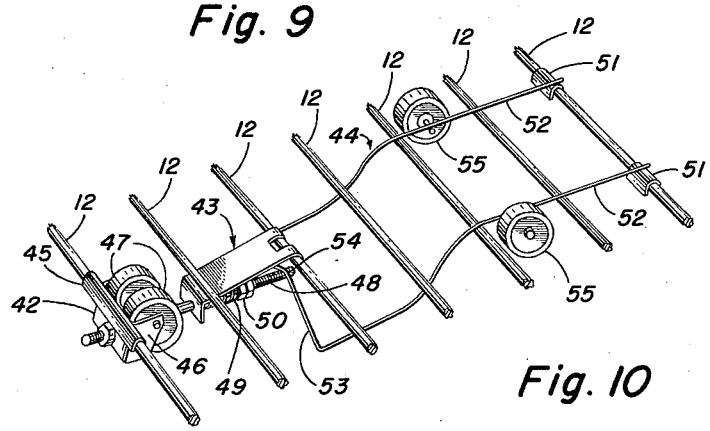
FIG. 10 is a fragmentary, oblique view of the belt support system utilized in FIGS. 8 and 9.

FIGS. 8, 9 and 10 illustrate this invention applied to a wheel conveyor. In this construction, the conveyor bed 10a has a pair of side rails 11 and a pair of intermediate rails 13 interconnected by axles 12 in a manner identical to the construction of the conveyor bed 10. As in the case of the conveyor bed 10, the intermediate rails 13 define a medial lane 14, flanked by a pair of conveyor tracks 15. However, in the case of the conveyor bed 10, conveyor wheels 40 are mounted on the axles 12 in a predetermined pattern to form the conveyor tracks 15.

A propelling member 20 is mounted for powered movement along the medial lane 14 in the direction of the arrow in FIG. 8. The propelling member is supported by a plurality of pressure assemblies 41 mounted at spaced intervals along the length of the conveyor. Each of the pressure assemblies 41 consists of a hanger 42, a supporting strap 43 and a sensing fitting 44.

The hanger 42 is flanged over at the top to form a hook 45, designed to seat over and pivot about one of the axles 12. The hanger also has a pair of arms 46 extending forwardly or downstream of the conveyor, each of which, at its forward or free end, mounts a freely rotatable propelling member support wheel 47. Extending forwardly or downstream of the hanger 42 is a rod 48. The rod 48 slidably passes through a hole in one end of the strap 43. The other end of the strap 43 is hooked over and swings about another one of the shafts 12. Forwardly or downstream of the point where the rod passes through the strap 43, the rod is surrounded by a compression spring 49. One end of the spring 49 bears against the strap 43 and the other against the pressure nut 50 mounted on the rod 48. The position of the pressure nut 50 along the rod 48 determines the force with which the spring 49 urges the hanger 42 forwardly and thus the wheels 47 upwardly.

The sensing fitting 44 is generally U-shaped and, at its downstream or forward end, has a pair of pivot pieces 51, one on the free end of each of the arms 52 of the sensing fitting. The pivot pieces 51 are designed to seat about and pivot on one of the axles 12. The rearward or upstream end of the sensing fitting 44 has a cross piece 53 which is arched upwardly at its center to form an apex 54 which seats over the forward end of the rod 48.

The forward end of the arms 52 are offset upwardly and at a point spaced rearwardly or upstream from the pivot pieces 51, each arm 52 rotatably mounts a sensing wheel 55. The upper surfaces of the sensing wheels 55 project above the upper surfaces of the conveying wheels 40 and of the propelling member 20. It will be recognized that the sensing wheels 55 can be dispensed with and the sensing fitting at the same point arched upwardly sufficiently to make direct contact with articles on the conveyor.

The spring 49 is placed under sufficient compression that the wheels 47 will support the propelling member with its upper or conveying surface flush with or preferably slightly above the top surfaces of the conveyor wheels 40 when the conveyor is unloaded or while an article is resting on both the propelling member and the conveying wheels 40. However, when such an article passes over the sensing wheels 55, they will be depressed, forcing the rearward or upstream end of the sensing fitting 44 downwardly, causing a corresponding downward movement of the support wheels 47. This downward movement is great enough to permit the propelling member, in the area of the particular supporting wheels 47, to drop sufficiently to disengage an article resting on the conveyor immediately above the particular supporting wheels so affected. It will be seen that as an article progresses down the conveyor, it will successively pass over one pressure assembly after another, individually actuating them and causing the corresponding portion of the propelling member rearwardly of the article to be rendered inoperative so far as its capacity to urge an article along the conveyor.

As in the case of the other sensing fittings described in connection with this invention, the sensing fitting 44 is preferably fabricated of small diameter rod or wire. Again, the component is lightweight and comparatively inexpensive.

Figure 11:
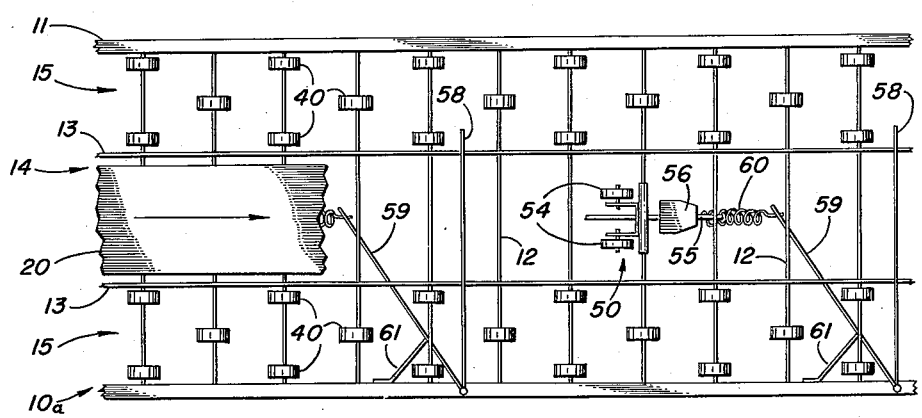
FIG. 11 is a fragmentary, plan view of a conveyor incorporating a still further modified form of this invention.
Figure 12:
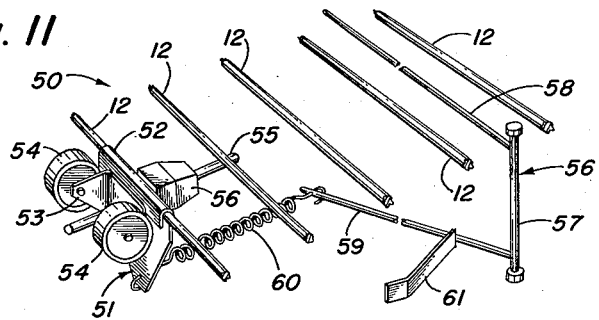
FIG. 12 is a fragmentary, oblique view of the belt support system illustrated in FIG. 11.

FIGS. 11 and 12 illustrate a somewhat different approach to this invention. In this case, the conveyor bed 10a is identical in construction to that illustrated in FIG. 8, having a pair of side rails 11, a pair of intermediate rails 13, a medial lane 14 and a pair of flanking conveyor tracks 15. The side rails 11 are joined by axles 12 on which conveyor wheels 40 are rotatably mounted in each of the flanking conveyor tracks 15. A propelling member 20 is moved under power lengthwise of the conveyor in the medial lane 14 in the direction of the arrow shown in FIG. 11. The propelling member 20 is supported at spaced intervals along the conveyor by support assemblies 50. Each of the support assemblies includes a hanger 51 having its upper end reversely flanged at 52 to hook over and swing about one of the axles 12. Projecting from the hanger upstream or rearwardly thereof are a pair of arms 53, on their rearward or free ends mounting freely rotatable propelling member support wheels 54. Projecting forwardly or downstream from each of the hangers 51 is a stud shaft 55 on which is mounted a counterweight 56.

Downstream or forwardly of the hanger 51 is a sensing assembly 56, having a vertical shaft 57 rotatably secured to one of the side rails 11. On the upper end of the vertical shaft 57, a sensing arm 58 projects laterally partially across the conveyor bed. The sensing arm 58 is located a short distance above the surface of the conveyor bed. An actuator arm 59, also attached to the vertical shaft 57, projects beneath the conveyor bed and, at its inner end, is connected to the hanger 51 by a spring 60. Suitable stop means, such as the bracket 61, may be secured to the side rail 11 to limit upstream or rearward movement of the actuator arm under the bias of the spring 60.

In the normal position of the pressure assembly 50, the weight 56 pivots the support wheels 54 upwardly to hold the propelling member 20 with its upper or conveying surface flush with or slightly above the plane of the top surfaces of the wheels 40. In this position, the spring 60, preferably, is almost relaxed and under only slight tension load. When an article is propelled along the conveyor by the propelling member 20 and strikes the sensing arm 58, it will rotate the arm downstream or forwardly. This will swing the arm 59 through a corresponding arc, placing the spring 60 under tension. This will pivot the hanger 51, lowering the support wheels 54. The swinging motion of the hanger 51 will continue until the forward end of the stud 55 contacts the adjacent downstream axle 12, preventing further movement of the hanger. At this point, the wheels 54 will have been lowered sufficiently to permit the propelling member to drop into a position where it disengages any article resting on the conveyor immediately above these wheels.

The spring 60 is so designed that, even after the hanger 51 has thus reached the limit of its pivotal travel, the sensing arm 58 and actuator arm 59 can continue to rotate to permit the article in contact with the sensing arm 58 to pass by. This is done by extending the spring 60. Thus, the spring 60 should be one of relatively low strength and permitting a relatively high degree of elongation. After the article has passed beyond the sensing arm 58 and releases it, the combined effect of the counterweight 56 and of the spring 60 will immediately return the arms 58 and 59 to their normal position with the actuator arm 59 resting against the stop 61.

Figure 13:
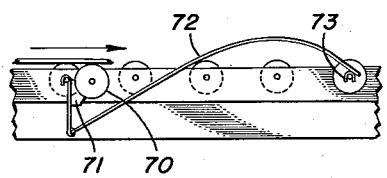
FIG. 13 is a fragmentary, side elevation view of a further modified form of this invention.
Figure 14:
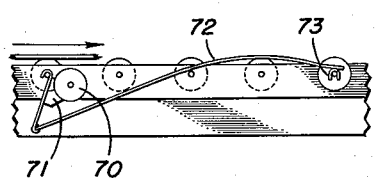
FIG. 14 shows the same structure as illustrated in FIG. 13 as it appears when distorted by pressure of an article passing over it on the conveyor.
Figure 15:
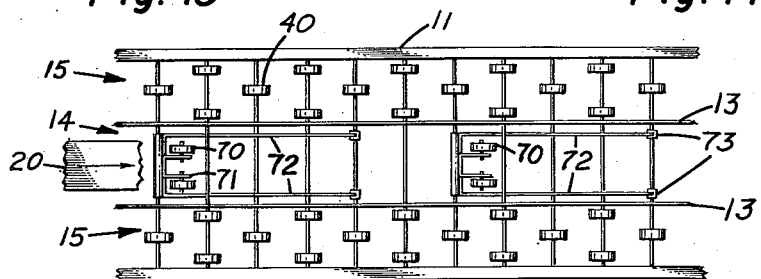
FIG. 15 is a fragmentary, plan view of a conveyor having the belt support system illustrated in FIGS. 13 and 14.

FIGS. 13 and 14 illustrate a still different approach to this invention. In this case the propelling member is supported by wheels 70 mounted on the pivoted hanger 71. The hanger 71, at its lower end, is pivotally connected to a sensing spring 72. The sensing spring 72 extends forwardly or downstream from the hanger, as indicated by the direction of movement of articles along the conveyor by the arrow in FIG. 14. The sensing spring 72 is arched upwardly to extend well above the plane of the top surface of the conveyor and at its forward end terminates in a pivot piece 73, designed to seat around one of the axles 12.

The sensing spring 72 is designed to have sufficient strength that, in assuming its pre-formed arched shape when no article is resting on it, it will hold the hanger 71 and thus the propelling member supporting wheels 70 in a position to support the propelling member at a normal operating position. However, it is so designed and its strength is such that when an article passing along the conveyor rides over the upwardly arched portion of the sensing spring 72 this arched portion will be partially collapsed or flattened. Since the pivot piece 73 forms a fixed terminus for the downstream end of the sensing spring 72, all lengthwise extension of the sensing spring 72 resulting from the flattening of its arched shape will result in movement of the upstream end, thus pivoting the hanger 71 about its supporting axles 12. As soon as the article is removed from the arched portion of the sensing spring 72, the natural resiliency of the spring will restore it to its original position, thus raising the propelling member supporting wheels 70. When the sensing spring 72 is flattened or collapsed, the support wheels 70 are lowered sufficiently that the propelling member, in the area above these wheels, disengages any articles resting on the conveyor. The sensing spring 72 is fabricated from spring wire or small diameter rod. Its diameter is chosen to produce the desired amount of resiliency and strength required for the particular application.

FIGS. 16, 17 and 18 illustrate another approach to this invention. The construction of the conveyor bed 10 is the same as that in FIG. 1. In this construction the pressure assemblies 80 are located in the medial lane 14 at spaced intervals, lengthwise of the conveyor. They support the propelling member 20.

Each of the pressure assemblies 80 consists of a pair of somewhat concave support fittings 81. The fittings are of wirelike spring rod having a terminal loop 82 at each end and a large flexing loop 83 substantially at their center. Between each of the terminal loops 82 and the flexing loop 83 is a pivot loop 84. One of the axles passes through each of the pivot loops 84 and supports the fittings 81. The pivot loops 84 are slightly larger than the axles, permitting these loops to contract slightly without binding on the axles.

The fittings 81 are arranged in pairs transversely of the conveyor. The rearward or upstream terminal loops of each pair are joined by a stud shaft 85 rotatably mounting a pair of propelling member support wheels 86 between the fittings and spaced to support the propelling member 20. The forward or downstream terminal loops are joined by a stud shaft 87 rotatably mounting a pair of sensing wheels 88 exteriorly of the fittings and positioned on each side of the propelling member 20. The wheels 86 are positioned to support the propelling member 20 in a normal operating position flush with or slightly above the top surface of the rollers 16 in the conveyor tracks 15. At the same time, the sensing wheels 88 are so supported that their top surfaces project above the top surfaces of both the rollers 16 and the propelling member 20.

In operation, articles passing along the conveyor under the influence of the powered propelling member 20 depress the sensing wheels 88. This causes the center portion, i.e., the flexing loop 83 of the pressure assembly to raise and the rearward end of the pressure assembly, i.e., the wheels 86 to drop. This condition is illustrated in phantom in FIG. 17. The amount to which the sensing wheels 88 are depressed is designed to cause the support wheels 86 to lower the propelling member 20 sufficiently to disengage a superimposed article resting on the rollers 16. When the sensing wheels 88 are released by removal of the article, the natural resilience of the fittings 81 restores the pressure assembly 80 to its normal position shown in solid lines. The flexing loop 83 gives the pressure assembly 80 substantial resilient strength and permits the distortion required for proper operation.

The pressure assembly 80a and the support fittings 81a illustrated in FIG. 18 are identical to the corresponding structure illustrated in FIG. 17 except for the substitution of pivot pieces 89 for the pivot loops 84. The pivot pieces 89 are of the same general construction as the pivot pieces 32 illustrated in FIG. 3 and are secured to the lower surfaces of the fittings 81a by any suitable means such as welding. The pivot pieces 89 are designed to seat over the axles 12. Equipped with the pivot pieces, the fittings 81a operate in a manner identical to that of the fittings 81 as suggested by the normal position of the pressure assembly 80a illustrated in solid lines and the depressed or activated position illustrated in phantom lines.

The construction illustrated in FIGS. 19 and 20 follows the same general principles as that illustrated in FIGS. 16, 17 and 18, although the mechanism by which it is carried out is somewhat different. The conveyor bed 10 is identical in construction to that illustrated in FIG. 16. The hanger or pressure assemblies 90 are located in the medial lane 14 at spaced intervals, lengthwise of the conveyor and support the propelling member 20.

Each hanger or pressure assembly 90 consists of a pair of fittings 91. Each fitting in turn consists of a pair of links 92 pivotally joined on one end by suitable means such as the pin 93. The pin 93 rides in a slightly elongated slot 94 in each link to permit pivotal movement of the links without binding. The pin extends across the pressure assembly and serves both pairs of links 92, making up a single pressure assembly 90.

The rearward links 92 at their rearward ends are joined by a shaft 95 which extends between the links on each side of the pressure assembly. The shaft 95 rotatably mounts a pair of wheels 96. The wheels 96 are located between the links and are laterally spaced to support the propelling member 20.

The forward links 92 at their forward ends are joined by a shaft 97 which extends between the links on each side of the pressure assembly. The shaft 97 rotatably mounts a pair of wheels 98. These are mounted exteriorly of the links 92 and are spaced laterally from the sides of the propelling member 20. Each of the links 92 intermediate their forward and rearward ends has a slot 99 opening through its lower edge, the slots serving as means to seat the axles 12. The links 92 are pivotally supported on the axles.

Beneath the pivot pin 93 a strap hanger 100 extends laterally across the conveyor bed. The strap hanger 100 may be mounted on the intermediate rails 13 as illustrated in FIG. 19 or on the side rails 11. A tension spring 101 having one end secured to the pin 93 and the other to the strap hanger 100 urges downwardly the pin 93 and, thus, the associated ends of the links 92.

The tension applied to the spring 101 is such that the wheels 96 support the propelling member 20 with its top surface flush with or slightly above the top surfaces of the rollers 16. At the same time the top surfaces of the sensing wheels 98 are held significantly above the top surface of the propelling member 20.

As articles being propelled along the conveyor pass over the sensing wheels 98, they are depressed against the bias of the spring 101. This simultaneously lowers wheels 96 sufficiently to effect disengagement between the propelling member 20 and articles resting on the rollers 16 (this position illustrated in phantom in FIG. 20). Release of the sensing wheels 98 by an article automatically restores the pressure assembly 90 to its normal position illustrated in solid lines in FIG. 20. A counterweight could replace spring 101 and give the same action.

In general, this invention may be used for a number of different purposes, such as automatically spacing articles along a conveyor or for eliminating the application of propelling force to all but the lead article of a group of articles resting on the conveyor and held against forward motion for any reason. As articles move along the conveyor, they are supported partially on the propelling member 20 and partially on the flanking conveyor tracks 15. Sufficient pressure exists between the propelling member and the articles to assure their continued movement along the conveyor. However, as the articles are successively propelled over each of the pressure assemblies, their weight will depress the sensing means of these assemblies. This results in lowering of the propelling member upstream or rearwardly of the article, thus creating a zone of negative or zero propelling force behind the article. This prevents the articles from making physical contact with each other if the zone of zero or negative pressure is long enough or spaced far enough rearward from the article.

Where a blockage against forward movement of the articles occurs on the conveyor, the lead article remains at all times under positive propelling force. Preferably the spacing of the pressure system is such that this lead article comes to a halt with some portion of it resting on one of the sensing fittings. Its position on one of the sensing fittings causes a zone of zero or negative pressure immediately behind it. The next article, upon entering this zone, ceases forward movement and itself rests on another of the sensing means, resulting in the creation of a second zone of zero or negative pressure immediately behind it. This pattern is repeated successively upstream of the conveyor so long as articles keep moving into the area of the blockade. Thus, the propelling member can be continuously operated without an increase in drag on the propelling member since the only article stationary on the conveyor under positive propelling force will be the lead article, the others being disengaged entirely from the propelling member.

When the blockage is removed allowing the lead article to be propelled forwardly, the sensing device depressed by this lead article is released, thus automatically restoring the pressure assembly to its normal position. This causes the propelling member under the second or next following article to reestablish contact with this article so that it is propelled forwardly. This, in turn, releases the sensing device controlling the pressure assembly acting upon the third article, causing it to move. It will be noted that there normally will be a short period during which movement of an article will occur before release of the pressure assembly it is actuating. This automatically spaces the released articles as they resume movement along the conveyor.

While this invention is not that of the principle of conveying herein described, it does disclose a simple, inexpensive and effective means by which these principles can be executed and effectively reduced to practical mechanical form.

While this invention has been described in a preferred embodiment, together with several modifications thereof, it will be understood that other modifications may be made. Such of these modifications as embrace the principles of this invention are to be considered as included in the hereinafter appended claims unless these claims by their language expressly state otherwise.

We claim:

1. In combination with a conveyor having a power operated propelling member flanked on each side by a low friction conveying track, the top surfaces of said propelling member and said conveying tracks cooperating to form a conveying surface; a plurality of vertically movable supports mounted in tandem on said conveyor beneath said propelling member, each of said supports being biased upwardly and having a portion adapted to bear against the under surface of said propelling member; a sensing fitting having a wire-like rod; means on said rod projecting above said conveying surface; said sensing fitting being vertically movable under the weight of an article seated over said projecting means; said sensing fitting being connected to said support for urging said support downwardly when said projecting means is depressed whereby said propelling member drops below article contacting position.

2. In combination with a conveyor having a power operated propelling member flanked on each side by a low friction conveying track, the top surfaces of said propelling member and said conveying tracks cooperating to form a conveying surface; a plurality of supports mounted in tandem on said conveyor beneath said propelling member; each of said supports having a hanger depending from said conveyor for swinging movement lengthwise of said conveyor and mounting low friction propelling member contacting elements; a sensing fitting having a wire-like rod; a portion of said rod being arched upwardly to project above said conveying surface; said sensing fitting being vertically movable under the weight of an article seated over said arched portion; said sensing fitting being connected to said hanger to swing said hanger to lower said contacting elements when said arched portion is depressed whereby said propelling member drops below article contacting position.

3. A conveyor as described in claim 2 wherein said arched portion of said sensing fitting is sheathed with a jacket characterized by a lubricous, wear resistant surface.

4. In combination with a conveyor having a power operated propelling member flanked on each side by a low friction conveying track, the top surfaces of said propelling member and said conveying tracks cooperating to form a conveying surface; a plurality of supports mounted in tandem on said conveyor beneath said propelling member; each of said supports having a hanger depending from said conveyor for swinging movement lengthwise of said conveyor and mounting low friction propelling member contacting elements; a sensing fitting having a pair of laterally spaced wire-like rods, one of said rods being on each side of said propelling member; a portion of each of said rods being arched upwardly to project above said conveying surface; said sensing fitting being vertically movable under the weight of an article seated over said arched portion; said sensing fitting being connected to said hanger to swing said hanger to lower said contacting elements when said arched portions are depressed whereby said propelling member drops below article contacting position.

5. In combination with a conveyor having a power operated propelling member flanked on each side by a low friction conveying track, the top surfaces of said propelling member and said conveying tracks cooperating to form a conveying surface; a plurality of supports mounted in tandem on said conveyor beneath said propelling member; each of said supports having a hanger depending from said conveyor for swinging movement lengthwise of said conveyor and mounting low friction propelling member contacting elements; a generally U-shaped sensing fitting having a pair of laterally spaced wire-like rods, one of said rods being on each side of said propelling member; a portion of each of said rods being arched upwardly to project above said conveying surface; said sensing fitting being vertically movable under the weight of an article seated over said arched portion; said hanger having a projecting stud; the bottom of said U-shaped sensing fitting bearing against said stud adjacent its free end to move said stud vertically when said arched portions are depressed; the interrelationship between said sensing fitting and said hanger being such that said contacting elements are lowered when said arched portions are depressed whereby said propelling member drops below article contacting position.

6. In combination with a conveyor having a pair of side rails connected by a plurality of axles extending crosswise thereof and spaced laterally of said conveyor and having a power operated propelling member flanked on each side by a low friction conveying track, the top surfaces of said propelling member and said conveying tracks cooperating to form a conveying surface; a plurality of supports mounted in tandem on said conveyor beneath said propelling member; each of said supports having a hanger depending from said conveyor for swinging movement lengthwise of said conveyor and mounting low friction propelling member contacting elements; a sensing fitting having a wire-like rod; a portion of said rod being arched upwardly to project above said conveying surface; said sensing fitting having a U-shaped pivot piece seated over one of said axles, said sensing fitting being pivotable about said axle on said pivot piece under the weight of an article seated over said arched portion; said sensing fitting being connected to said hanger to swing said hanger to lower said contacting elements when said arched portion is depressed whereby said propelling member drops below article contacting position.

7. A sensing fitting adapted to be mounted on a conveyor for sensing the presence of and making contact with articles moving along the conveyor, said sensing fitting comprising: a generally U-shaped element of wire-like rod having a cross piece and a pair of side members; each of said side members intermediate its ends having an offset portion extending normal to the direction of said cross piece, said offset portions being smoothly curved; a U-shaped pivot piece mounted to each of said side members and opening oppositely from said offset portions.

8. A sensing fitting as described in claim 7 wherein said pivot pieces are mounted at the free ends of said side members.

9. A sensing fitting as described in claim 7 wherein said pivot pieces are mounted to said side members at a point adjacent the midpoint thereof.

10. In combination with a conveyor having a pair of side rails connected by a plurality of axles extending crosswise thereof and spaced laterally of said conveyor and having a power operated propelling member flanked on each side by a low friction conveying track, the top surfaces of said propelling member and said conveying tracks cooperating to form a conveying surface; a plurality of supports mounted in tandem on said conveyor beneath said propelling member; each of said supports having a hanger depending from said conveyor for swinging movement lengthwise of said conveyor and mounting low friction propelling member contacting elements; a sensing fitting of wire-like spring rod extending lengthwise of said conveyor; one end of said fitting being pivotally connected to said hanger and the other rotatably seated against one of said axles and held against horizontal movement; said sensing fitting intermediate said ends having a portion arched upwardly to project above said conveying surface; said arched portion being adapted to flatten when an article rests thereon forcing said one end away from said other end, swinging said hanger and depressing said contacting elements whereby said propelling member drops below article contacting position.

11. In a conveyor having a bed equipped with transverse members, propelling member supporting means comprising: a hanger pivotally mounted at one of its ends to one of said transverse members; a propelling member contacting element mounted on said hanger; a sensing fitting of wire-like spring rod having one end pivotally secured to said hanger and the other end mounted to another of said transverse members and at a point spaced from said pivotally mounted end of said hanger said other end being fixed against movement longitudinally of said conveyor; said sensing fitting intermediate said ends being arched whereby flattening of said arch will urge said one end of said sensing fitting away from the other end thereof and swing said hanger about its said pivoted end; said sensing fitting in unloaded position holding said hanger in a predetermined pivoted position.

12. In combination with a conveyor having a power operated propelling member flanked on each side by a low friction conveying track, the top surfaces of said propelling member and said conveying tracks cooperating to form a conveying surface; a plurality of supports mounted in tandem on said conveyor beneath said propelling member; each of said supports having a hanger depending from said conveyor for swinging movement lengthwise of said conveyor and mounting low friction propelling member contacting elements; a sensing fitting rotatably mounted to said conveyor on one side thereof and having a sensing arm extending laterally partially across said conveyor above said conveying surface and adapted for swinging movement generally parallel to said conveying surface; means beneath said conveyor operatively connecting said sensing fitting to said hanger for movement of said hanger with said sensing fitting when said arm is pivoted laterally by an article on said conveying surface.

13. A conveyor as described in claim 12 wherein said means has a lost motion connection permitting said sensing fitting to continue rotation after said hanger reaches the limit of its pivotal travel.

14. In combination with a conveyor having a power operated propelling member flanked on each side by a low friction conveying track, the top surfaces of said propelling member and said conveying tracks cooperating to form a conveying surface; a plurality of supports mounted in tandem on said conveyor beneath said propelling member; each of said supports having a hanger depending from said conveyor for swinging movement lengthwise of said conveyor and mounting low friction propelling member contacting elements; a sensing fitting having a vertical shank rotatably mounted to said conveyor on one side thereof; said shank having a first arm extending laterally partially across said conveyor above said conveying surface; said shank having a second arm movable therewith and extending beneath said conveyor; said first and second arms being adapted for swinging movement generally parallel to said conveying surface; a lost motion linkage connecting said second arm to said hanger for pivoting said hanger and said contacting elements downwardly when an article on said conveyor contacts said first arm and swings said first arm out of its path.

15. In combination with a conveyor having a power operated propelling member flanked on each side by a low friction conveying track, the top surfaces of said propelling member and said conveying tracks cooperating to form a conveying surface; a plurality of vertically movable supports mounted in tandem on said conveyor beneath said propelling member, each of said supports having a pair of ends spaced lengthwise of said conveyor; one of said ends having means for supporting said propelling member from beneath, the other of said ends having sensing means projecting above said conveying surface; each of said supports pivotally movable substantially at the center and rockably supported between said center and each of said ends whereby vertical movement of one end will result in movement in the same direction as the other; each of said supports being biased to urge said ends upwardly.

16. A conveyor as recited in claim 15 wherein each of said supports is shaped from rod-like resilient wire and at said pivotal center is shaped into a loop to give said support said resilient bias.

17. A conveyor as recited in claim 15 wherein each of said supports has a pair of rigid links and means pivotally joining said links at the adjacent ends thereof; said biasing being effected by resilient means operatively connected to said links at said pivotal juncture.

18. A propelling member support means comprising: a hanger having a support end portion and a sensing end portion hingedly joined substantially at the center of said hanger; a propelling member contacting element mounted on said support end portion; means for rockably seating each of said end portions about a fixed support, said means being significantly spaced from both the free ends of said end portions and said hinged juncture; means biasing said hinged juncture downwardly and said free ends of said end portions upwardly.

19. A propelling member support as recited in claim 18 having a pair of said hangers; a first shaft connecting the free ends of said support end portions; a second shaft connecting the free ends of said sensing end portions; a pair of wheels mounted on each of said shafts, said wheels on said second shaft being spaced apart a greater distance than those on said first shaft.

No references cited.